US005194075A

United States Patent [19]

Matsuoka

[11] Patent Number: 5,194,075

[45] Date of Patent: Mar. 16, 1993

[54] EVAPORATIVE FUEL RECOVERY APPARATUS

[75] Inventor: Hiroki Matsuoka, Susono, Japan

[73] Assignee: Toyota Jidosha Kabushiki Kaisha, Toyota, Japan

[21] Appl. No.: 860,318

[22] Filed: Mar. 30, 1992

[30] Foreign Application Priority Data

Apr. 1, 1991 [JP] Japan .................................... 3-68619

[51] Int. Cl.$^5$ .............................................. B01D 53/04

[52] U.S. Cl. ........................................ 55/195; 55/267; 55/387

[58] Field of Search .................. 55/189, 190, 195, 387, 55/267–269; 123/519, 520

[56] References Cited

U.S. PATENT DOCUMENTS

| | | | |
|---|---|---|---|
| 3,683,597 | 8/1972 | Beveridge et al. | 55/387 X |
| 3,854,911 | 12/1974 | Walker | 55/387 |
| 3,934,989 | 1/1976 | Haugen | 55/189 X |
| 4,430,099 | 2/1984 | Yanagisawa et al. | 55/387 X |
| 4,714,485 | 12/1987 | Covert et al. | 55/189 |
| 4,869,739 | 9/1989 | Kanome et al. | 55/387 X |
| 4,872,439 | 10/1989 | Sonoda et al. | 123/519 |
| 4,887,578 | 12/1989 | Woodcock et al. | 123/519 |
| 4,919,103 | 4/1990 | Ishiguro et al. | 123/519 X |

FOREIGN PATENT DOCUMENTS

| | | |
|---|---|---|
| 61-053451 | 3/1986 | Japan . |
| 61-257322 | 11/1986 | Japan . |
| 2-014454 | 1/1990 | Japan . |

OTHER PUBLICATIONS

Transaction No. 90171 ("Zireishu") of Japan Automotive Manufacturers Association, Inc. (JAMA), published Mar. 18, 1991.

*Primary Examiner*—Robert Spitzer
*Attorney, Agent, or Firm*—Kenyon & Kenyon

[57] ABSTRACT

An evaporative fuel recovery apparatus includes a purge line, coupled to a fuel tank and a canister, for feeding fuel vapor, evaporated in the fuel tank, into the canister, the canister containing an adsorbent for storing the fuel vapor from the fuel tank therein, a return fuel line, coupled to an intake passage and the fuel tank, for feeding excess fuel, remaining in the fuel return passage and not injected into the intake passage, back to the fuel tank, a vacuum pump provided in the fuel return passage, the vacuum pump generating vacuum pressure due to a flow of the excess fuel being fed back to the fuel tank through the fuel return passage. The vacuum pressure generated by the vacuum pump forcing returning fuel vapor flowing through the purge passage back to the fuel tank via a vapor return line coupled to the vacuum pump and the purge passage.

8 Claims, 4 Drawing Sheets

EVAPORATIVE FUEL RECOVERY APPARATUS

BACKGROUND OF THE INVENTION (1.) Field of the Invention

The present invention generally relates to an evaporative fuel recovery apparatus, and more particularly to an evaporative fuel recovery apparatus in which fuel vapor, evaporated in a fuel tank, is returned back to the fuel tank via a vapor return passage between a canister and the fuel tank.

(2) Description of the Related Art

Generally, in an evaporative fuel control device, fuel vapor that is evaporated in a fuel tank is fed into a canister containing such an adsorbent as activated carbon, so that a certain amount of fuel vapor is adsorbed in the adsorbent of the canister, thus preventing the fuel vapor from escaping to the atmosphere. However, the quantity of fuel vapor that can be stored in the canister is limited as the capacity of the canister to store fuel vapor in the adsorbent is limited. When a great amount of fuel vapor is fed into the canister, the amount of the fuel vapor exceeds the capacity of the canister and the excessive vapor may escape from an opening of the canister to the atmosphere. In order to prevent the canister from having too much fuel vapor stored therein, it is desirable to use an evaporative fuel recovery device in which the fuel vapor is returned back to the fuel tank.

In the prior art, there is an evaporative fuel recovery device in which fuel vapor, evaporated in a fuel tank, is returned back to the fuel tank. Such a device is disclosed, for example, in Japanese Laid-Open Patent Application No. 61-257322. In this evaporative fuel recovery device, a vapor liquid separator for separating liquid fuel from fuel vapor is mounted in a vapor supply passage between a fuel tank and a canister, which passage connects the fuel tank to the canister so that fuel vapor can be supplied from the fuel tank to the canister. The liquid fuel separated by the separator is returned back to the fuel tank. However, in the above mentioned conventional device, it is necessary to additionally mount a vapor liquid separator in the vapor supply passage, and thus the structure of the evaporative fuel recovery device becomes complicated, and thus manufacturing costs increase. Also, in the case of the conventional device, there is a problem in that fuel vapor not liquefied due to the separator is not returned to the fuel tank but is instead fed to the canister, to be stored therein. The ability of the separator to separate liquid fuel from fuel vapor is not enough to recover the fuel due to the structure of the separator. Thus, it is difficult for the conventional device to efficiently return the fuel vapor back to the fuel tank, and thus it is not possible to prevent the canister from having too much fuel vapor stored therein.

SUMMARY OF THE INVENTION

Accordingly, it is a general object of the present invention to provide an improved evaporative fuel recovery apparatus in which the above described problems are eliminated.

Another and more specific object of the present invention is to provide an evaporative fuel recovery apparatus which can efficiently return the fuel vapor, evaporated in the fuel tank, back to the fuel tank, without using the vapor liquid separator in the apparatus. The above mentioned object of the present invention is achieved by an evaporative fuel recovery apparatus which includes a purge line, coupled to a fuel tank and a canister, for feeding fuel vapor, evaporated in the fuel tank, into the canister, the canister containing an adsorbent for storing the fuel vapor from the fuel tank therein, a return fuel line, coupled to an intake passage and the fuel tank, for feeding excess fuel, remaining in the fuel return passage and not injected into the intake passage, back to the fuel tank, a vacuum pump provided in the fuel return passage, the vacuum pump generating vacuum pressure due to a flow of the excess fuel being fed back to the fuel tank through the fuel return passage, and a vapor return line, coupled to the vacuum pump and the purge passage, for forcedly returning fuel vapor flowing through the purge passage back to the fuel tank by means of the vacuum pressure generated by the vacuum pump. According to the present invention, it is possible to forcedly send the fuel vapor, before or after it is fed to the canister, back to the fuel tank through the vapor return passage due to vacuum pressure generated by the vapor jet vacuum pump. Thus, the amount of the fuel vapor stored in the canister can be reduced by the evaporative fuel recovery apparatus of the present invention, and it is possible to prevent the canister from having too much fuel vapor stored therein.

Other objects and further features of the present invention will be more apparent from the following detailed description when read in conjunction with the accompanying drawings.

DESCRIPTION OF THE PREFERRED EMBODIMENTS

Figure 1:
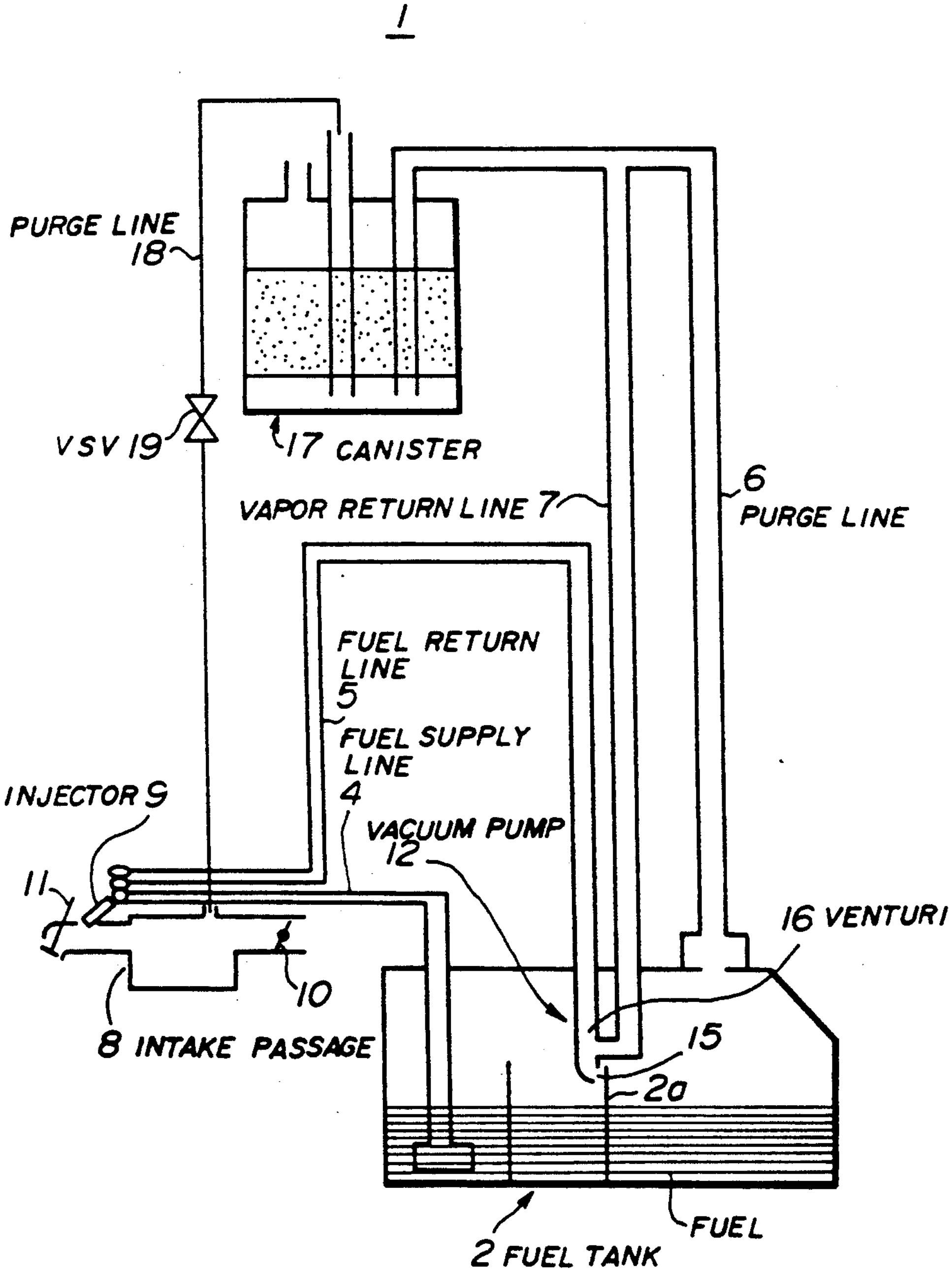
FIG. 1 is a view showing an evaporative fuel recovery apparatus according to a first embodiment of the present invention.

A description will now be given of a first embodiment of the present invention, with reference to FIG. 1. In FIG. 1, an evaporative fuel recovery apparatus 1 according to the present invention and a fuel tank 2 in which fuel is stored are shown. A fuel supply line 4, a fuel return line 5, a purge line 6, and a vapor return line 7 are connected to the fuel tank 2. The fuel supply line 4 and the fuel return line 5 are provided between the fuel tank 2 and an injector 9 mounted in an intake passage 8 of an engine. The fuel supply line 4 is a fuel passage through which the fuel within the fuel tank 2 is supplied to the injector 9 so that the supplied fuel is injected by the injector 9 into the intake passage 8. In the intake passage 8, a throttle valve 10 and an intake valve 11 are mounted in the engine. The fuel return line 5 is a fuel passage through which excess fuel that is supplied to the injector 9 but not injected into the intake passage 8 is returned back to the fuel tank 2. In the fuel supply line 4 and the fuel return line 5, a fuel pump, a fuel filter and a pressure regulator (not shown) are mounted for carrying out fuel injection, and a description thereof will be omitted for the sake of convenience.

The vapor return line 7 is coupled to the fuel return line 5 at an end portion thereof located within the fuel tank 2, and a vacuum pump 12 is provided at this end portion of the fuel return line 5. This vacuum pump 12 is a vapor jet vacuum pump which generates vacuum pressure due to a flow of the return fuel being fed from the injector 9 to the fuel tank through the fuel return line 5. The vacuum pump 12 includes a venturi 16, and the venturi 16 is formed on an inside wall of the vacuum pump 12.

Figure 2:
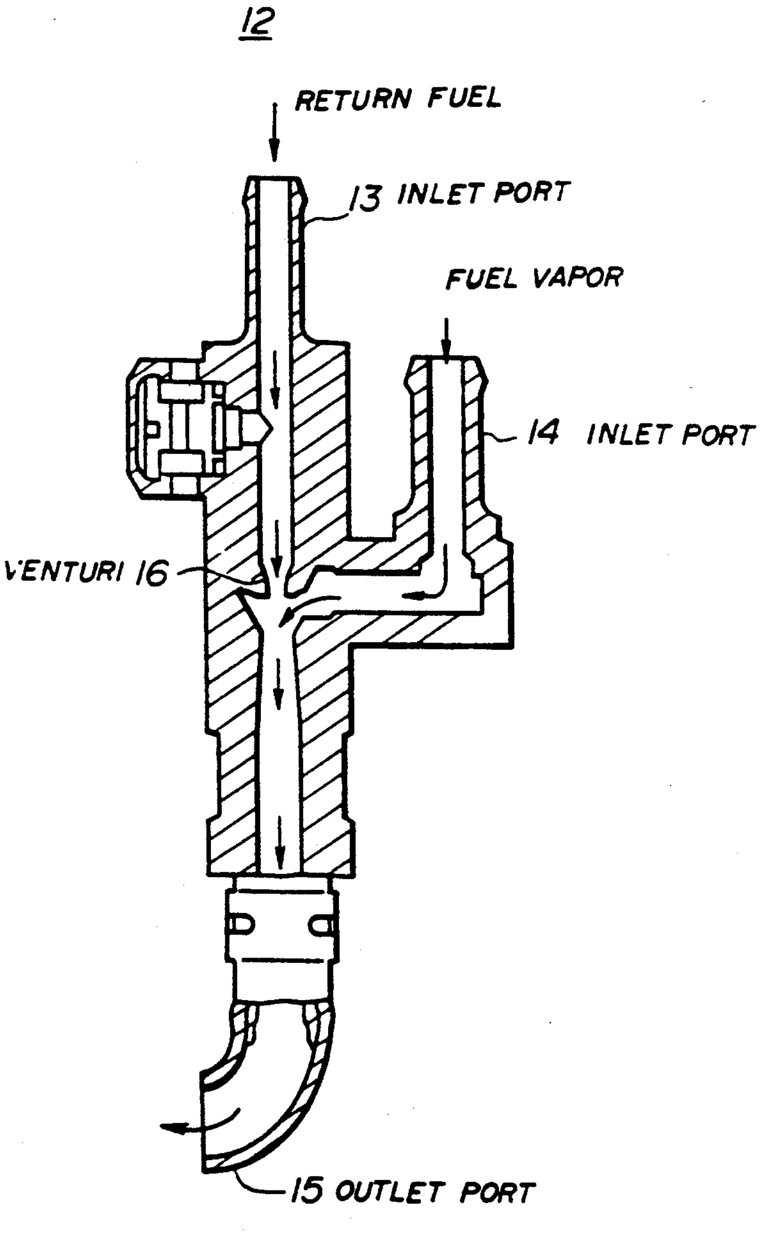
FIG. 2 is a sectional view showing the construction of a vacuum pump used in the evaporative fuel recovery apparatus according to the first embodiment of the present invention.

FIG. 2 shows the construction of the vacuum pump 12 used in the evaporative fuel recovery apparatus. The vacuum pump 12 has two inlet ports 13 and 14, and an outlet port 15, and includes a first fluid passage extending from the inlet port 13 to the outlet port 15 and a second fluid passage extending from the inlet port 14 to the venturi 16 The venturi 16 of the vacuum pump 12 is formed by restricting an inside wall of an intermediate section of the vacuum pump. The second fluid passage is connected to an intermediate section of the first fluid passage downstream of the venturi 16, this fluid passage being L-shaped to have a vertical channel and a horizontal channel so that return fuel vapor from the inlet port 14 is discharged at the intermediate section of the first fluid passage into the first fluid passage. The fuel return line 5 is connected to the inlet port 13 of the vacuum pump 12, and the vapor return line 7 is connected to the inlet port 14 thereof. The vacuum pump 12 having the simple structure as described above can be constructed by forming a venturi in the fluid passages of the vacuum pump 12. Owing to this simple structure, manufacturing cost of such a vacuum pump is relatively low, and it seldom experiences any problem detrimental to the operation of the evaporative fuel recovery apparatus.

When return fuel in the fuel return line 5 is fed from the inlet port 13 to the outlet port 15 due to a fuel returning action by the fuel pump, the speed of the fluid is increased due to the venturi 16, and the return fuel in the first fluid passage flows out at the outlet port 15 into the fuel tank 2 while the fluid in the second fluid passage is induced to flow toward the outlet port 15 due to the venturi 16. At the same time, vacuum pressure takes place at the inlet port 14 in the second fluid passage so that the fluid in the vapor return line 7 is drawn toward the fuel tank 2 due to the vacuum pressure. The outlet port 15 of the vacuum pump 12 is L-shaped, and an end surface of the outlet port 15 is located adjacent to a separation wall *2a* provided in the fuel tank 2, so that the return fuel being fed from the outlet port 15 drops onto the surface of the separation wall *2a*, and the return fuel flowing through the fuel return line 5 is returned to the fuel tank 2.

The purge line 6 is a fuel vapor passage which connects the fuel tank 2 and a canister 17 and through which fuel vapor, evaporated in the fuel tank 2, is sent into the canister 17. The canister 17 contains an adsorbent such as active carbon, and the fuel vapor sent through the purge line 6 is adsorbed and stored in the adsorbent of the canister 17. In addition to the purge line 6, a purge line 18 is connected to the canister 17. This purge line 18 is a fuel vapor passage through which fuel vapor stored in the canister 17 is purged into the intake passage 8. An an intermediate portion of the purge line 18, a vacuum switching valve (VSV) 19 is mounted to control a flow of the fuel vapor from the canister to the intake passage 8. When the VSV 19 is opened, the fuel vapor stored in the canister 17 is supplied into the intake passage 8. With the above described evaporative fuel recovery apparatus 1, the fuel consumption rate of the engine is increased, thus preventing the canister 17 from having too much vapor stored therein.

In the fuel vapor recovery apparatus shown in FIG. 1, the vapor return line 7 is connected at one end portion thereof to the canister 17 and connected at the other end portion thereof to the vacuum pump 12. More specifically, the end portion of the vapor return line 7 is connected to the canister 17 via an intermediate portion of the purge line 6 upstream of the canister 17, and the other end portion of the vapor return line 7 is connected to the vacuum pump 12 via the inlet port 14. When vacuum pressure is generated at the inlet port 14 due to the vacuum pump 12, fuel vapor flowing through the purge line 6 is induced to flow to the vapor return line 7 before the fuel vapor reaches the canister 17. The fuel vapor in the purge line 6, which vapor is directed toward but does not reach the canister 17, is fed to the vacuum pump 12 through the vapor return line 7, and then returned back to the fuel tank 2 when the return fuel is returned to the fuel tank 2 through the fuel return line 5.

Accordingly, it is possible to reduce the amount of the fuel vapor stored in the canister 17, and thus prevent the canister from having too much fuel vapor stored therein. Also, by switching OFF the VSV 19 to close the fuel vapor passage of the purge line 18 when vacuum pressure is generated in the vapor return line 7, the canister 17 containing the adsorbent is subjected to vacuum pressure. Therefore, if the internal pressure of the fuel tank 2 is relatively low, it is possible to return the fuel vapor, stored in the canister 17, back to the fuel tank 2 through the vapor return line 7. This function by which the fuel vapor is returned from the canister to the fuel tank is called a back purging function. As the evaporative fuel recovery apparatus of the present invention can achieve this back purging function, the amount of fuel vapor stored in the canister can be reduced further. In addition, the adsorbing ability of the adsorbent of the canister can be improved, thus preventing the adsorbing ability of the adsorbent in the canister from deteriorating.

In the return fuel that is returned to the fuel tank 2 through the vapor return line 7, fuel vapor in a gaseous state and liquid fuel in a liquid state coexist in a mixed manner. Part of the fuel vapor is liquefied by cooling it to normal temperature within the purge line 6 or the vapor return line 7, and thus changed into liquid fuel, but the remaining fuel vapor remains in a gaseous state. Therefore, if the outlet port 15 of the vacuum pump 12 is placed at a low position of the fuel tank 2, which position is located below the surface level of fuel contained in the fuel tank 2, a problem arises in that undesired bubbles are produced in the fuel in the fuel tank 2 due to the gaseous-state fuel vapor in the return fuel.

However, according to the present invention, as the end surface of the L-shaped outlet port 15 of the vacuum pump 12 is so arranged as to be adjacent to the separation wall *2a* in the fuel tank 2, the return fuel fed from the outlet port 15 drops onto the surface of the separation wall *2a* so that it is smoothly fed into the fuel tank 2. Thus, the above mentioned bubbling phenomenon does not arise in the evaporative fuel recovery apparatus of the present invention. The purge line 6 and the vapor return line 7 have a relatively large surface area, and fuel vapor flowing through these lines 6 and 7 is subject to heat dissipation, so that the fuel vapor is easily liquefied due to the heat dissipation on the large surface area of the purge line 6 and the vapor return line 7, thereby preventing the bubbling phenomenon from occurring. In addition, the fuel vapor fed from the vapor return line 7, together with the return fuel fed from the fuel return line 5, is returned back to the fuel tank 2 via the vacuum pump 12, so that the internal pressure of the fuel tank 2 can be increased, thus reducing the amount of fuel vapor evaporated in the fuel tank 2.

Figure 3:
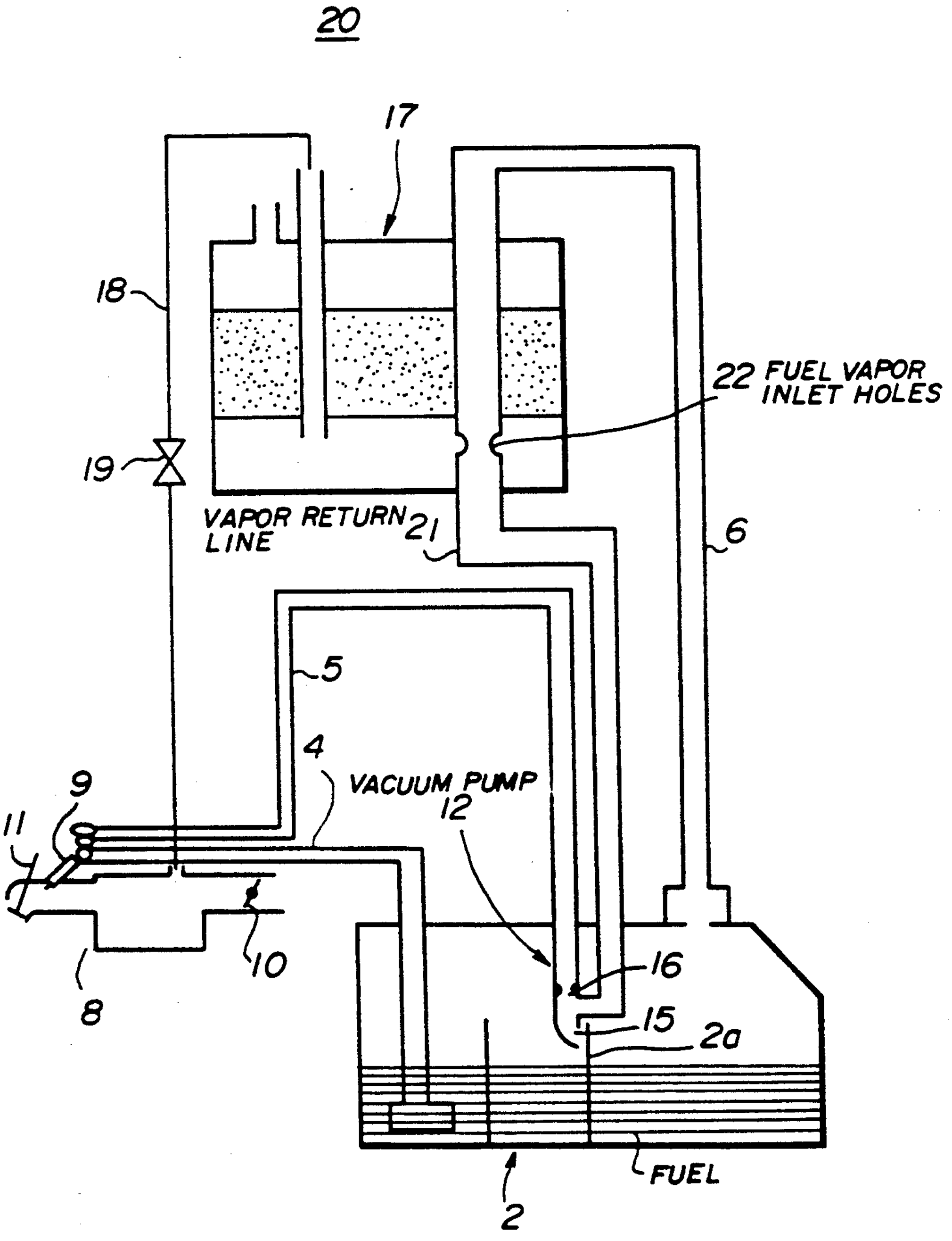
FIG. 3 is a view showing an evaporative fuel recovery apparatus according to a second embodiment of the present invention.

Next, a description will be given of a second embodiment of the present invention, with reference to FIG. 3. In FIG. 3, an evaporative fuel recovery apparatus 20 having a vapor return line 21 is shown, those parts which are the same as the corresponding parts in FIG. 1 being designated by the same reference numerals, and a description thereof being omitted.

In the above described first embodiment shown in FIG. 1, one of the end portions of the vapor return line 7 is connected to the canister 17 via the intermediate portion of the purge line 6 upstream of the canister 17. In the evaporative fuel recovery apparatus 20 shown in FIG. 3, the vapor return line 21 is connected directly to the canister 17, within which an end portion of the vapor return line 21 is connected to an end portion of the purge line 6 via a plurality of fuel vapor inlet holes 22. The end portion of the purge line 6 and the end portion of the vapor return line 21 are vertically aligned, and the inlet holes 22 are formed at the end portion of the vapor return line 21, which portion is located in a lower part of the canister 17.

In the second embodiment shown in FIG. 3, as the purge line 6 and the vapor return line 21 are arranged vertically, most of fuel vapor passing through the purge line 6 is fed to the vapor return line 21, so that the fuel vapor is returned back to the fuel tank 2. If the internal pressure of the fuel tank 2 is extremely high, the fuel vapor within the fuel tank 2 flows into the canister 17 through the inlet holes 22 at the end portion of the vapor return line 21, thereby preventing the internal pressure of the fuel tank 2 from becoming extremely high. Thus, with the evaporative fuel recovery apparatus 20 shown in FIG. 3, it is possible to efficiently return the fuel vapor back to the fuel tank 2 through the vapor return line 21.

In the second embodiment described above, there are several methods for connecting the vapor return line 21 to the canister 17. In one method, for example, a hose is used to connect the vapor return line 21 to the canister 17. In another method for connecting the vapor return line 21 to the canister 17, an O-ring for preventing fuel vapor leakage is inserted into a flange.

Figure 4:
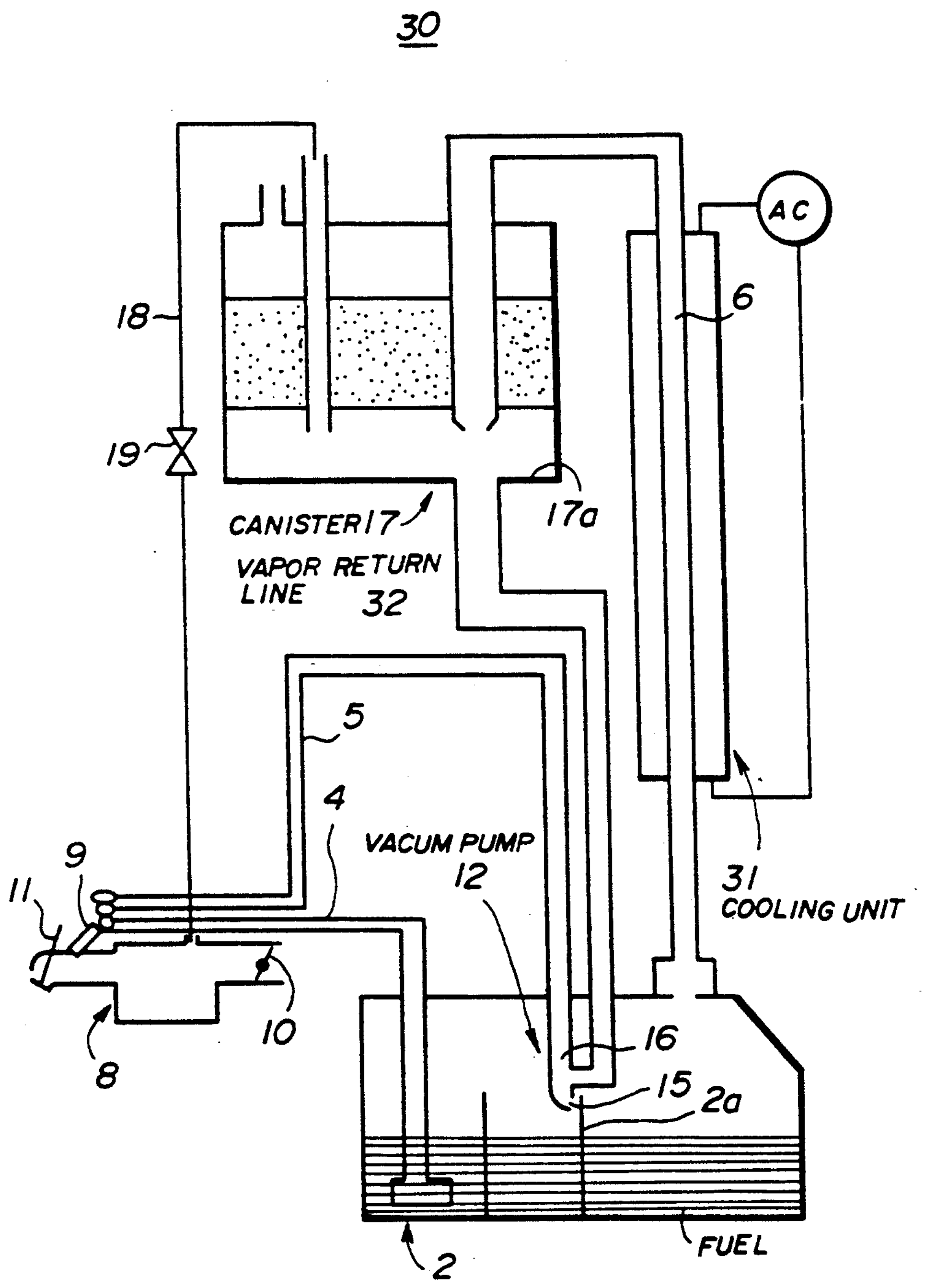
FIG. 4 is a view showing an evaporative fuel recovery apparatus according to a third embodiment of the present invention.

Next, a description will be given of a third embodiment of the present invention, with reference to FIG. 4. In FIG. 4, an evaporative fuel recovery apparatus 30 having a cooling unit 31 and a vapor return line 32 is shown, those parts which are the same as the corresponding parts in FIG. 1 being designated by the same reference numerals, and a description thereof being omitted.

In the evaporative fuel recovery apparatus 30 shown in FIG. 4, the cooling unit 31 is mounted on the vapor line 6, and the vapor return line 32 is connected to the canister 17 at an opening formed on a bottom surface 17*a* of the canister 17. The cooling unit 31 is provided to cool fuel vapor being evaporated in the fuel tank 2 and passed through the purge line 6 so that the fuel vapor is liquefied. By making use of an evaporator provided in a cooler system of an automotive vehicle, this cooling unit 31 as mentioned above can be arranged on the purge line 6. When the fuel tank 2 has a very high temperature, or immediately after the fuel tank 2 has been replenished with fuel, the fuel is rapidly evaporated in the fuel tank 2. In such a case, it is possible to efficiently liquefy the fuel vapor passing through the purge line 6 by means of the cooling unit 31, thus preventing the internal pressure of the fuel tank 2 from increasing to an extremely high pressure.

In the third embodiment shown in FIG. 4, the vapor return line 32 is connected at an end portion thereof to the opening on the bottom surface 17*a* of the canister 17. Thus, it is possible to easily feed liquid fuel, liquefied in the canister 17, into the vapor return line 32, so that the fuel vapor stored in the canister 17 is returned back to the fuel tank 2. Also, it is possible to easily mount the vapor return line 32 on the canister 17.

Further, the present invention is not limited to the above described embodiments, and variations and modifications may be made without departing from the scope of the present invention.

What is claimed is:

1. An evaporative fuel recovery apparatus comprising:

purge passage means, coupled to a canister and a fuel tank, for feeding fuel vapor, evaporated in the fuel tank, into the canister, said canister containing an adsorbent for storing the fuel vapor from the fuel tank therein;

fuel return passage means, coupled to an intake passage and the fuel tank, for feeding excess fuel, remaining in the fuel return passage means and not injected into the intake passage, back to the fuel tank;

a vacuum pump provided in said fuel return passage means, said vacuum pump generating vacuum pressure due to a flow of the excess fuel being fed back to the fuel tank through the fuel return passage means; and vapor return passage means, coupled to the vacuum pump and the purge passage means, for forcedly returning fuel vapor fed through the purge passage means back to the fuel tank by means of the vacuum pressure generated by the vacuum pump.

2. An apparatus according to claim 1, wherein said vacuum pump is a vapor jet vacuum pump including a venturi that is formed on an inside wall of the vacuum pump, said venturi being located at an end portion of the fuel return passage means.

3. An apparatus according to claim 1, wherein said vacuum pump is a vapor jet vacuum pump including a venturi, a first fluid passage extending from a first inlet port to an outlet port, and a second fluid passage extending from a second inlet port to the venturi, said first fluid passage being connected to the fuel return passage means, said second fluid passage being connected to the vapor return passage means, said vacuum pump thus generating vacuum pressure in the vapor return passage means when the excess fuel from the fuel return passage means is fed from the first inlet port to the outlet port via said venturi.

4. An apparatus according to claim 1, wherein said vacuum pump includes an outlet port whose end surface is located adjacent to a separation wall provided in the fuel tank so that fuel being fed from the outlet port of the vacuum pump drops onto the separation wall and then returned back to the fuel tank.

5. An apparatus according to claim 1, wherein said vapor return passage means includes a plurality of fuel vapor inlet holes at its end portion, said inlet being located within the canister, and said end portion of said vapor return passage means being connected to an end portion of the purge passage means via said fuel vapor inlet holes.

6. An apparatus according to claim 5, wherein said vacuum pump is a vapor jet vacuum pump including a venturi, a first fluid passage extending from a first inlet port to an outlet port, and a second fluid passage extending from a second inlet port to the venturi, said first fluid passage connected to the fuel return passage means, said second fluid passage connected to the vapor return passage means, said vacuum pump thus generating vacuum pressure in the vapor return passage means when the excess fuel from the fuel return passage means is fed from the first inlet port to the outlet port via said venturi.

7. An apparatus according to claim 1, wherein said purge passage means is connected at its end portion to the canister, and said vapor return passage means is connected at its end portion to an opening formed on a bottom surface of the canister, so that liquid fuel, liquefied in the canister, is fed into the vapor return passage means and then returned back to the fuel tank.

8. An apparatus according to claim 7, further comprising a cooling unit provided in the purge passage means to cool fuel vapor being evaporated in the fuel tank and passed through the purge passage means so that the fuel vapor is liquefied.

* * * * *

UNITED STATES PATENT AND TRADEMARK OFFICE
CERTIFICATE OF CORRECTION

PATENT NO. : 5,194,075

DATED : March 16, 1993

INVENTOR(S) : Hiroki MATSUOKA

It is certified that error appears in the above-identified patent and that said Letters Patent is hereby corrected as shown below:

Column 7, line 6, between "inlet" and "being" at end of line, insert --holes--.

Signed and Sealed this

Twenty-fifth Day of January, 1994

Attest:

BRUCE LEHMAN

*Attesting Officer* *Commissioner of Patents and Trademarks*